United States Patent
Revelli

(10) Patent No.: US 11,297,755 B2
(45) Date of Patent: Apr. 12, 2022

(54) METHOD FOR CONTROLLING A SOIL WORKING MEANS BASED ON IMAGE PROCESSING AND RELATED SYSTEM

(71) Applicant: VOLTA ROBOTS S.r.l., Milan (IT)

(72) Inventor: Silvio Revelli, Milan (IT)

(73) Assignee: VOLTA ROBOTS S.r.l., Milan (IT)

(*) Notice: Subject to any disclaimer, the term of this patent is extended or adjusted under 35 U.S.C. 154(b) by 248 days.

(21) Appl. No.: 16/616,562

(22) PCT Filed: May 29, 2018

(86) PCT No.: PCT/IB2018/053811
§ 371 (c)(1),
(2) Date: Nov. 25, 2019

(87) PCT Pub. No.: WO2018/220528
PCT Pub. Date: Dec. 6, 2018

(65) Prior Publication Data
US 2021/0136993 A1  May 13, 2021

(30) Foreign Application Priority Data
May 30, 2017  (IT) .................. 102017000058505

(51) Int. Cl.
*A01B 69/04* (2006.01)
*A01B 79/00* (2006.01)
(Continued)

(52) U.S. Cl.
CPC .......... *A01B 69/008* (2013.01); *A01B 79/005* (2013.01); *A01D 34/008* (2013.01); *A01D 75/00* (2013.01); *G05D 1/0088* (2013.01); *G05D 1/0223* (2013.01); *G05D 1/0251* (2013.01); *G06K 9/628* (2013.01); *G06K 9/6256* (2013.01);
(Continued)

(58) Field of Classification Search
None
See application file for complete search history.

(56) References Cited

U.S. PATENT DOCUMENTS

2018/0300620 A1* 10/2018 Gerardo Castro .... G01S 13/862
2020/0068799 A1*  3/2020 Slembrouck ......... G05D 1/0274

FOREIGN PATENT DOCUMENTS

CN    106647758 A    5/2017
JP    2944774 B2     9/1999

* cited by examiner

*Primary Examiner* — Jonathan M Dager
*Assistant Examiner* — Garrett F Evans
(74) *Attorney, Agent, or Firm* — Arent Fox LLP; Michael Fainberg

(57) ABSTRACT

The invention relates to a method for controlling a soil working means, based on an image processing. Such a soil working means comprises a locomotion member and a working member. The method comprises the steps of acquiring at least one digital image of the soil by means of digital image acquisition means installed on the working means; processing, by means of an electronic processing unit, the at least one digital image acquired by performing at least one convolution operation on the digital image by means of a trained neural network; obtaining, by means of the electronic processing unit, at least one synthetic soil descriptor based on such a processing; generating, by means of the electronic processing unit, at least one control signal of the locomotion member or of the working member based on the synthetic soil descriptor.

30 Claims, 14 Drawing Sheets

(51) Int. Cl.
*A01D 34/00* (2006.01)
*A01D 75/00* (2006.01)
*G05D 1/00* (2006.01)
*G05D 1/02* (2020.01)
*G06K 9/62* (2022.01)
*G06N 3/04* (2006.01)
*G06N 3/08* (2006.01)
*G06V 20/56* (2022.01)
*A01D 101/00* (2006.01)

(52) U.S. Cl.
CPC ................ *G06N 3/04* (2013.01); *G06N 3/08* (2013.01); *G06V 20/56* (2022.01); *A01D 2101/00* (2013.01); *G05D 2201/0201* (2013.01); *G05D 2201/0208* (2013.01)

| CLASS | CODE |
| --- | --- |
| Grass | 1 |
| Not grass | 0 |

FIG. 3C

| CLASS | CODE |
| --- | --- |
| Overgrown grass | 000 |
| Cut grass | 001 |
| Grass with leaves | 002 |
| Grass with flagstones | 003 |
| Grass with soil | 004 |
| Grass with log | 005 |
| Grass with branches | 006 |
| Grass with ball | 007 |
| Grass with bush | 008 |
| Grass with hose | 009 |
| Grass with tool | 010 |
| Grass with item | 011 |
| Grass with pine cone | 012 |
| Paving | 500 |
| Wall | 501 |
| Road | 502 |
| Obstacle | 503 |
| Unidentified | 504 |
| Dirty camera | 999 |

FIG. 3B

| CLASS | CODE |
|---|---|
| Keep going straight | 000 |
| Stop the motion | 001 |
| Increase steering to the right | 101 |
| Increase steering to the left | 102 |
| Center steering | 103 |

FIG. 5B

METHOD FOR CONTROLLING A SOIL WORKING MEANS BASED ON IMAGE PROCESSING AND RELATED SYSTEM

CROSS-REFERENCE TO RELATED APPLICATIONS

This application is a National Phase filing of PCT International Application No. PCT/IB2018/053811, having an International Filing Date of May 29, 2018, claiming priority to Italian Patent Application No. 102017000058505, having a filing date of May 30, 2017 each of which is hereby incorporated by reference in its entirety.

FIELD OF APPLICATION

The present invention generally relates to the field of the control of soil working machines, such as, for example, lawn mowers, harvesters, plows and the like. In particular, the invention is directed to a method for controlling a soil working means based on image processing through convolutional neural networks. The present invention also relates to a system comprising a soil working means which implements the aforesaid method.

PRIOR ART

Lawn mowing machines or robotic lawn mowers configured to operate autonomously, i.e. without the guidance of an operator, are currently available on the market for residential use. Furthermore, in the commercial field, the demand for harvesters adapted to operate autonomously or semi-autonomously, and in general for agricultural soil working machines which minimize human intervention, is growing.

To date, various systems and related control methods are known, which allow to control the movement of a lawn mower to confine the operating scope thereof within the related working area and to direct it towards the areas of the field to be cut.

Some robotic lawn mowers for residential use move along randomly selected trajectories. For such robotic lawn mowers, a continuous border-delimiting device, for example a peripheral cable, is employed to control that the robot itself does not exit the predetermined working area.

Other robotic lawn mowers on the market are equipped with sensors adapted to detect a mass presence. Such sensors provide the condition of mass presence/absence at a certain height from the ground to a control unit of the lawn mower. Such information is interpreted by a lawn mower processing unit as the presence/absence of grass.

Known machines which operate on large surfaces, mainly for commercial or agricultural use, are generally equipped with an on-board GPS antenna and, optionally, are operatively associated with one or more GPS antennas installed on the ground (differential GPS). The machine is equipped with a processing unit configured to compare current machine coordinates with preset coordinates which delimit the periphery of the working area and is, therefore, capable of keeping the machine in the assigned area. Instead, from the comparison of the current coordinates of the machine with the historical ones, such a processing unit may set machine movement trajectories which do not overlap those already traveled.

In the residential, commercial and agricultural field, detecting the position of a robotic lawn mower or of an autonomous field working machine by means of the employment of radiofrequency devices or beacons, of the type known to a skilled in the art of wireless communication, is known. More radiofrequency beacons are placed at key points of the field to be worked. The processing unit which equips the lawn mower or the machine may determine the unique position thereof based on a calculation of distances from the aforesaid beacons, and therefore confine the movement of the lawn mower or of the machine in the stored periphery and generate movement trajectories which do not overlap those already traveled.

All of the known solutions described above have the drawback of always requiring the employment of infrastructure outside the robotic lawn mower or the working machine, i.e. the peripheral wire, the satellite antennas or the beacons, in order to allow the correct control and confinement of such machines in a working area. Therefore, these are solutions which require an initial infrastructure laying step and the related configuration of such a structure, as well as, of course, the maintenance thereof. Such solutions are, therefore, complex and, for the reasons set out above, with limited portability.

The control by means of image processing does not find concrete application to date because the proposed methods are not sufficiently robust to manage the plurality of perturbations present in a real operating environment. These perturbations include: shadows of objects; shadow of the lawn mower itself; reflected light and refractions; presence of dry vegetables; inflorescences; camera under-exposed or over-exposed, also due to the movement of the vehicle; different perception caused by weather phenomena; different perception due to the direction of travel of the lawn mower; cereals having non-nominal height; perspective distortions due to not flat soil or pitch of vehicle; oblique or swaying plants due to the wind; plants or grass partially covered by foliage; plants or herbs different from those expected or infesting; flooded areas or puddles; absence of plants or grass in an area; presence of three-dimensional obstacles; non-full obstacles, for example high voltage pylons; flat obstacles; people or animals present along the direction of travel.

With specific reference to lawn mowers for residential use, it is also noted that a plurality of perturbations are also present in a garden which, as is known, is a dynamic environment that is continuously changing with the succession of the seasons and due to frequent works for renewal and maintenance.

SUMMARY OF THE INVENTION

It is the object of the present invention to devise and provide a method and a related system for the control of a soil working means which allows to at least partially overcome the drawbacks mentioned above with reference to the methods of the known solutions.

Such an object is achieved by a method for controlling a soil working means in accordance with claim 1. In particular, the invention relates to a method for controlling a soil working means based on image processing performed with a trained convolutional neural network.

A main aspect of the present invention is the application of a neural network which implements a series of subsequent convolutions, by internally constructing a hierarchical representation, not necessarily interpretable, of the characteristics of the image. This network provides a synthetic descriptor of the soil configured to allow the soil working means to perform complex operations in an autonomous way.

The method of the invention ensures a double advantage.

Since the modeling of soil is not explicitly encoded by a human being but learned automatically by the machine, a first advantage is that the system that implements the method has high cognitive capabilities and a high degree of generalization. This makes the system of the invention robust to the perturbations listed above, thus overcoming the limits of the prior art.

In particular, the Applicant has verified that the system is robust to unexpected events, the presence of unexpected plants, variation in lighting and light and shadows games.

A second advantage is that the system of the invention can autonomously perform movements that are coherent with the soil which until now were unthinkable—both of the locomotion member and of the cutting member. The element that determines this capacity is the synthetic descriptor of the soil that carries the information necessary to the control member. For example, as described below, the working means of soil can distinguish the various obstacles and perform, as a consequence, the best possible action. Or, for example, it can follow the previous cutting line in a robust and safe way compared to obstacles or unexpected conditions. Or, for example, it can perform continuous actions directly associated with the acquired image.

Preferred embodiments of such a control method are described in the dependent claims 2-24, 30-31.

The present invention also relates to a system implementing the aforesaid method in accordance with claim 25.

BRIEF DESCRIPTION OF THE DRAWINGS

Further features and advantages of the control method and of the related system in accordance with the invention will become apparent from the following description of preferred embodiments, given by way of indicative and non-limiting example, with reference to the accompanying drawings, in which:

FIGS. 3B and 3C show, in tables, examples of coding different land cover classes;

FIG. 5B shows, in a table, examples of coding action classes;

In the aforesaid Figures, equal or similar elements are indicated by the same reference numerals.

DETAILED DESCRIPTION OF THE PREFERRED EMBODIMENTS

Figure 1:
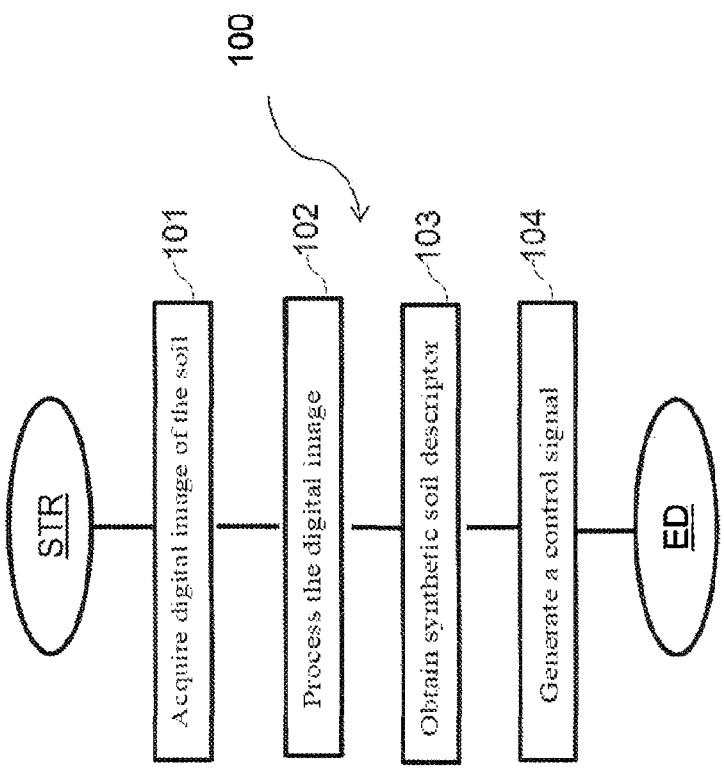
FIG. 1 shows a flowchart of a control method of a soil working means based on image processing in accordance with the present invention.

With reference to FIG. 1, a method for controlling a soil working means in accordance with the present invention is indicated by reference numeral 100. In particular, the invention relates to a method for controlling a soil working means based on image processing. Below, such a control method of the working means 100 is also simply referred to as a control method.

Figure 2:
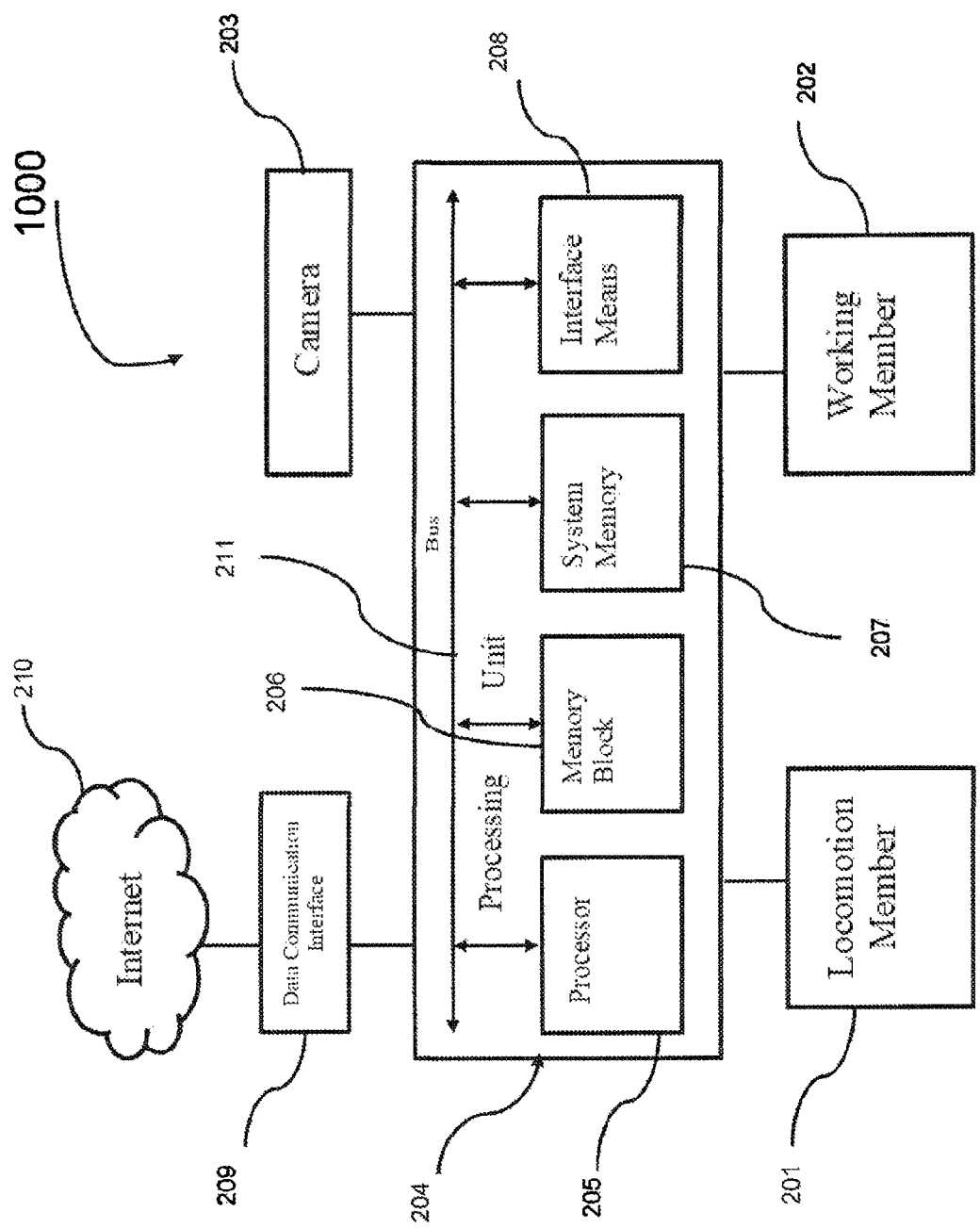
FIG. 2 shows a block diagram of a soil working system based on image processing implementing the method of FIG. 1.

With reference to FIG. 2, a system comprising the aforesaid soil working means is indicated, as a whole, with reference numeral 1000.

Such a soil working means is, for example, selected from the group consisting of: lawn mower, harvester, plow, cereal cutting-harvesting machine, vegetable cutting-harvesting machine, hay cutting-harvesting machine and any similar machine whose passage on the soil alters the visual perception of the soil itself.

The working means of the system 1000 comprises a suitable locomotion member 201 and a working member 202.

The afore-mentioned locomotion member 201 includes, by way of example, a propulsion unit powered by a respective fuel, a steering unit, a stability control and safety control unit and an electric power supply unit (e.g. battery). Furthermore, such a locomotion member 201 may also include suitable input/output communication interfaces for receiving command signals and returning signals indicating movement.

The working member 202 includes a suitable working tool, movable by means of a respective motor, and further input/output communication interfaces for receiving command signals and returning signals indicating performed work.

Furthermore, the system 1000 comprises digital image acquisition means 203 installed on the working means to acquire at least one digital image of the soil. Such image acquisition means are embodied, for example, by one or more cameras 203.

Such cameras 203 may acquire a more or less wide portion of the surrounding soil, based on the number thereof, the position thereof and the geometry of the lens which characterizes the field of view thereof. Such cameras 203 and analogous image acquisition means may receive images in grayscale or preferably in the color-coded visible spectrum (for example, RGB). Such image acquisition means may be configured to operate in the infrared and ultraviolet spectrum, or to complete the optical information with a channel dedicated to depth (for example, RGB-D).

The system 1000 further comprises an electronic processing unit 204 connected to the digital image acquisition means 203 and to the afore-mentioned locomotion member 201 and working member 202 of the soil working means.

Such an electronic processing unit 204 comprises at least one processor 205 and one memory block 206, 207 associated with the processor for storing instructions. In particular, such a memory block 206, 207 is connected to the processor 205 by means of a data communication line or bus 211 (for example, PCI) and consists of a service memory 206 of the volatile type (for example, of the SDRAM type), and of a system memory 207 of the non-volatile type (for example, of the SSD type).

In greater detail, such an electronic processing unit 204 comprises input/output interface means 208 connected to the at least one processor 205 and to the memory block 206, 207 by means of the communication bus 211 to allow an operator near the system 1000 to interact directly with the processing unit itself. Such input/output interface means 208 comprise, for example, a touch display operating from a data input/output and information display interface.

Furthermore, the electronic processing unit 204 is associated with a wired or wireless data communication interface 209 configured to connect such a processing unit 204 to a data communication network, for example the Internet network 210, to allow an operator to remotely interact with the processing unit 204 or to receive updates.

With reference to FIG. 1, the operating steps of the method 100 for controlling a soil working means, based on an image processing, implemented by means of the system 1000, are described below in greater detail.

In an embodiment, the electronic processing unit 204 of the system 1000 is set to execute the codes of an application program implementing the method 100 of the present invention.

In a particular embodiment, the processor 205 is configured to load, in the memory block 206, 207, and execute the codes of the application program implementing the method 100 of the present invention.

In the more general embodiment, the control method 100 comprises a first step 101 of acquiring at least one digital image of the soil by means of digital image acquisition means 203, i.e. the cameras, installed on the working means.

The method 100 then comprises a step 102 of processing, by means of an electronic processing unit 204, the at least one digital image acquired.

Advantageously, such a processing includes performing at least one convolution operation on the digital image acquired by means of a trained neural network 300, 400, 500.

It should be noted that such a neural network 300, 400, 500 employed for performing the method comprises at least one convolutional layer. Furthermore, such at least one convolution operation is accomplished by means of a feed-forward of the neural network.

Figure 3A:
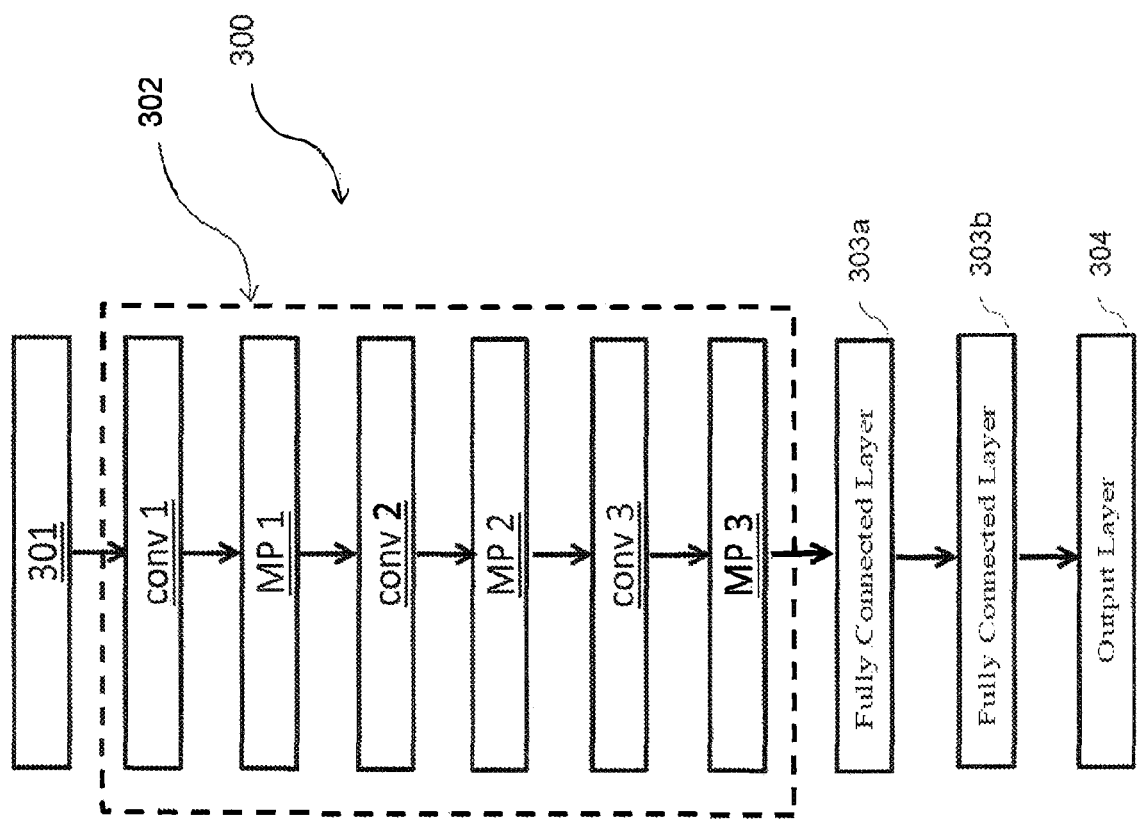
FIG. 3A shows a logical diagram of a first embodiment of a neural network, comprising convolutional levels, employed in the method of the invention and configured to return a soil classification starting from a digital image.
Figure 4A:
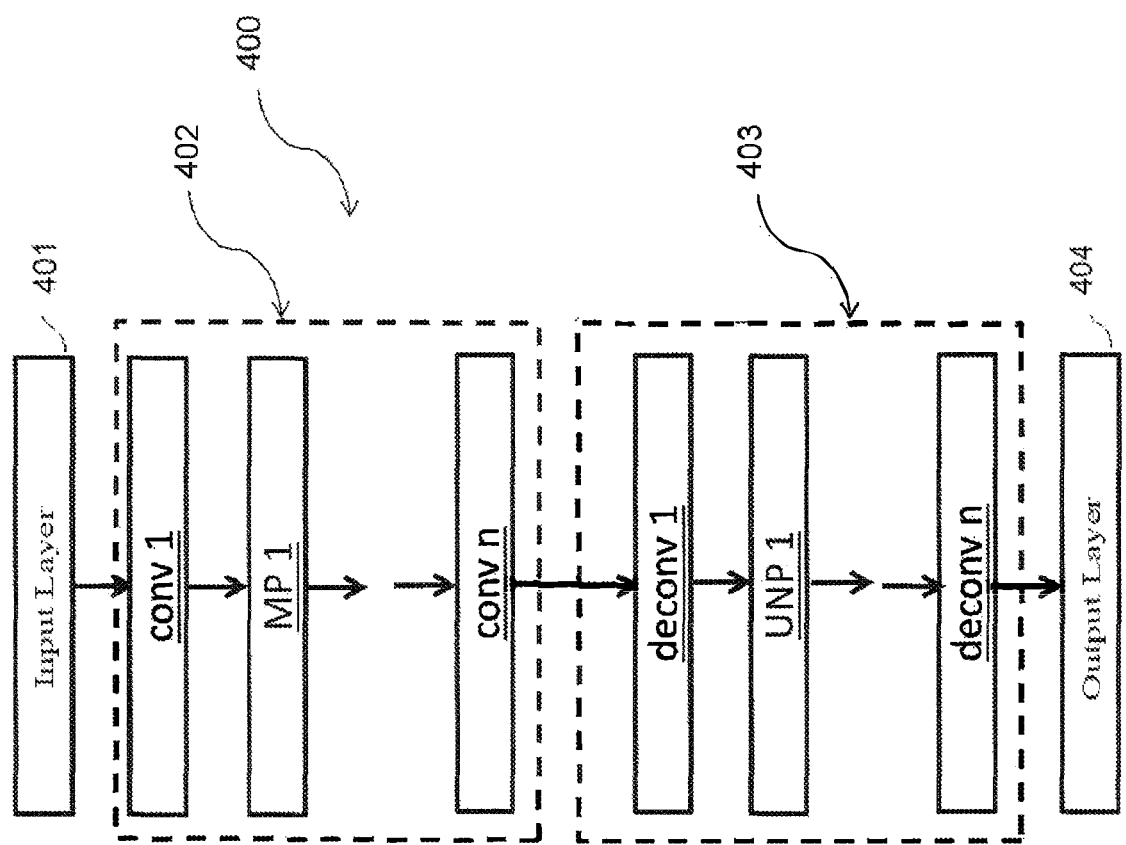
FIG. 4A shows a logical diagram of a second embodiment of a neural network, comprising convolutional and deconvolutional levels, employed in the method of the invention and configured to return a semantically segmented image starting from a digital image acquired.
Figure 5A:
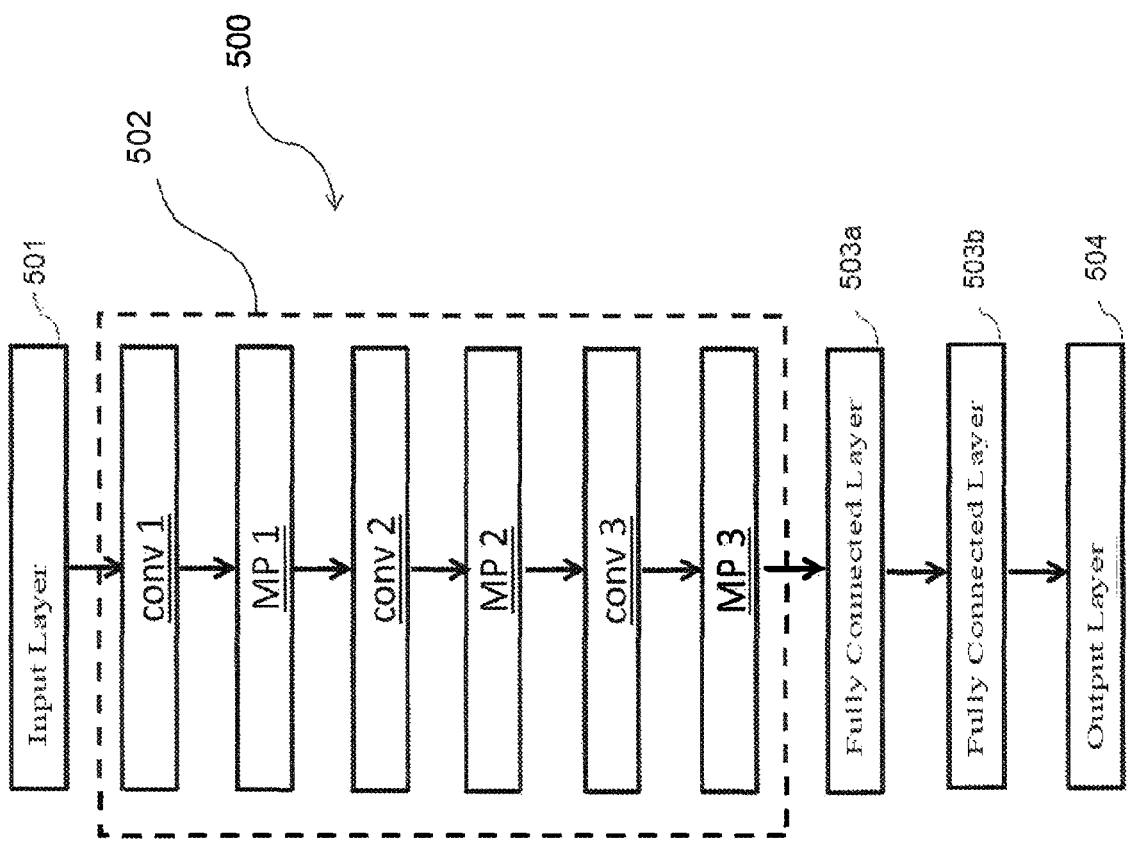
FIG. 5A shows a logical diagram of a third embodiment of a neural network, comprising convolutional levels, employed in the method of the invention and configured to return a desirable action starting from a digital image acquired.

Examples of such a convolutional neural network 300, 400, 500 are shown in FIGS. 3A, 4A, and 5A, respectively. Each of these three examples of convolutional neural network returns a particular form of synthetic descriptor of the soil: the 300 network returns a global classification of the image; the 400 network returns a semantic segmentation; the 500 network returns an action. These networks will be described in greater detail below.

Advantageously, the control method 100 of the invention includes a step 103 of obtaining, by means of the electronic processing unit 204, at least one synthetic soil descriptor based on such a processing.

The method 100 also comprises a step 104 of generating, by means of the electronic processing unit 204, at least one signal for controlling one of the afore-mentioned locomotion member 201 or working member 202 of the working means based on such a synthetic soil descriptor.

In a different embodiment of the method of the invention, the aforesaid generation step 104 comprises the steps of generating at least one control signal of the locomotion member 201 and at least one control signal of the working member 202.

In other words, the method of the invention allows to control the locomotion member 201 and the working member 202 in a concomitant manner.

The control method 100 further comprises a step of generating, based on the aforesaid synthetic soil descriptor, data and/or parameters describing the nature or structure of the soil itself.

In greater detail, such describing parameters comprise a border or a discontinuity between two soil areas having different properties.

Even in greater detail, such a border or discontinuity comprises a border between soil areas including plant species of different height or a border between previously cut or worked soil areas and areas not yet cut or worked (e.g. already cut grass-uncut grass).

With reference to FIGS. 3A, 3B, 3C, in a first embodiment of the invention, such a synthetic soil descriptor is a soil classification. As used herein, the term "soil classification" includes classification of different types of land cover. In this case, the convolutional neural network 300 or first convolutional network 300 comprises at least the following layers:

an input layer 301 configured to receive the entire digital image or at least one down-sample of such a digital image acquired with the cameras 203;

at least one convolutional layer conv 1;

at least one fully connected layer 303*a*;

an output layer 304 with at least one neuron configured to make the distinction between at least two soil classes available.

In greater detail, the network 300 which operates on the basis of soil classification comprises a convolution block 302 consisting of three convolutional layers conv 1, conv 2, conv 3 in cascade and of three Max Pooling layers MP1, MP2, MP3, of the type known to a skilled in the art.

Each Max Pooling layer MP1, MP2, MP3 is directly connected to the output of a respective convolutional layer. Such Max Pooling layers perform a discretization operation of the image samples with the aim of resizing them.

As known, in a convolutional layer of a neural network, each neuron is connected only to some neighboring neurons in the previous layer. The same set of weights (and local connection layout) is used for each neural connection. On the contrary, in a fully connected layer of the network, each neuron is connected to each neuron of the previous layer and each connection has its own weight.

In the example of FIG. 3A, the neural network 300 consists of two fully connected layers 303*a* and 303*b*. These two layers are similar to convolutions having a kernel covering the entire input layer of the neural network 300. Therefore, these are two further convolutions configured to provide a global meaning to the input layer.

According to a preferential aspect of the present invention, the method 100 has been implemented to autonomously guide a robotic lawn mower in the working area. Specifically, step 102 was accomplished by means of a neural network 300, in which the input layer consists of 35.643 neurons, i.e. of a 3×109×109 neuron matrix (where 3 are the chromatic channels and 109×109 is the resolution of the input image). Experimentally, such a resolution is particularly suitable for the purpose of grass recognition, since the input image is small enough to be rapidly processed by electronic processing units available on the market at low cost (for example: Odroid XU4, or NVIDIA TX2), but still large enough to carry the information content required to identify the characterizing features of the turf. The first convolutional layer conv 1 in FIG. 3A has kernels of 4×4 pixels in size and a stride of 1 pixel. Such a layer conv 1 includes 20 output filters of 106×106 in size. The Max Pooling layer MP of FIG. 3A has kernels equal to 2×2 and a stride equal to 2: thereby, the size of each filter is reduced to 53×53. By performing subsequent convolution and pooling operations with analogous parameters, smaller filters are gradually obtained. Once the convolutional step 302 has been completed in the strict sense, the filters are connected to the two fully connected layers 303a and 303b. According to a preferential aspect, the neural network 300 includes a dropout layer, known to a skilled in the art, which helps generalization. The output layer 304 has a number of neurons equal to the number of different grassy soil classes. In an embodiment, a softmax operator is employed to normalize the value of such neurons of the output layer 304.

FIGS. 3B and 3C show, in tables, two examples of coding different soil classes. Each class is associated with a neuron of the output layer 304. In particular, the table in FIG. 3B associates a different numerical code for each soil class which may be discriminated by the control method 100 by means of the neural network 300 starting from the acquired images.

As it may be noticed, in addition to codifying the presence/absence of grass to be cut on the soil and the presence of items in the grass to be cut, coding obstacles and/or other particular items is also included as well as possible malfunction conditions of the camera 203.

In an application example of the control method 100 of the invention, the employment of only two classes linked to the traversability of the soil itself is provided. In this case, the structure of the neural network 300 remains substantially unchanged, except for the output layer 304 which preferably has a single neuron. The activation of such a neuron is, for example, indicative of the complete presence of grass in the image of the soil region acquired by the cameras 203. Vice versa, the lack of neuron activation is indicative of the soil region in question not being completely grassy and containing obstacles. With reference to the table in FIG. 3C, only the presence/absence of grass to be cut is coded in a binary manner.

It should be noted that the neural network 300 may be suitable for different types of grasses or cereals, as well as for different agricultural soils and thus used in the control method 100 and applied to the related system 1000. For example, in case of application to a harvesting machine in a field of ripe wheat, such a neural network 300 returns whether the machine encounters wheat in front thereof or is facing an area without wheat (for example a road, or a trellis).

With reference to FIG. 4A, in a second embodiment of the control method 100, the synthetic soil descriptor is a soil semantic segmentation. In this case, the convolutional neural network 400 or second convolutional neural network 400 comprises at least the following layers:

an input layer 401 configured to receive the entire digital image or at least one down-sample of the digital image acquired with the cameras 203;
at least one convolutional layer conv 1;
at least one deconvolutional layer deconv 1;
an output layer 404 configured to make a soil image semantically segmented in at least two classes available.

In greater detail, the network 400 which operates on the basis of soil semantic segmentation comprises a respective convolution block 402 consisting of a plurality of convolutional layers, for example n layers, conv 1, . . . , conv n in cascade, spaced out by n−1 Max Pooling layers MP1, . . . MPn−1.

Furthermore, the neural network 400 comprises a respective deconvolution block 403 consisting of a plurality of deconvolutional layers, for example n layers, deconv 1, . . . , deconv n in cascade, spaced out by n−1 Un-pooling layers UNP1, . . . UNPn−1, of the type known to a skilled in the art. Such a second deconvolution block 403 carries out a function opposite to that carried out by the convolution block 402, i.e. it is configured to rebuild the semantically segmented image starting from the image fragmented by the convolution block 402.

Again with reference to the preferential and non-limiting aspect of grass cutting, a neural network of the FCN type (Fully Convolutional) 400 has been accomplished having a convolutional part unchanged with respect to that of the neural network 300. According to this further variant of step 102 of the control method 100, the output of the network is more articulated with respect to a simple grassy soil class and is given by a segmented image in the different types of grass or obstacles that the lawn mower may encounter during the working. The deconvolutional blocks operate in a manner opposite to those previously described, sharing fundamental properties thereof: thereby, the image is rebuilt to be segmented in the original resolution (which, in the case of the above-mentioned lawn mower, is 109×109).

Figure 4B:
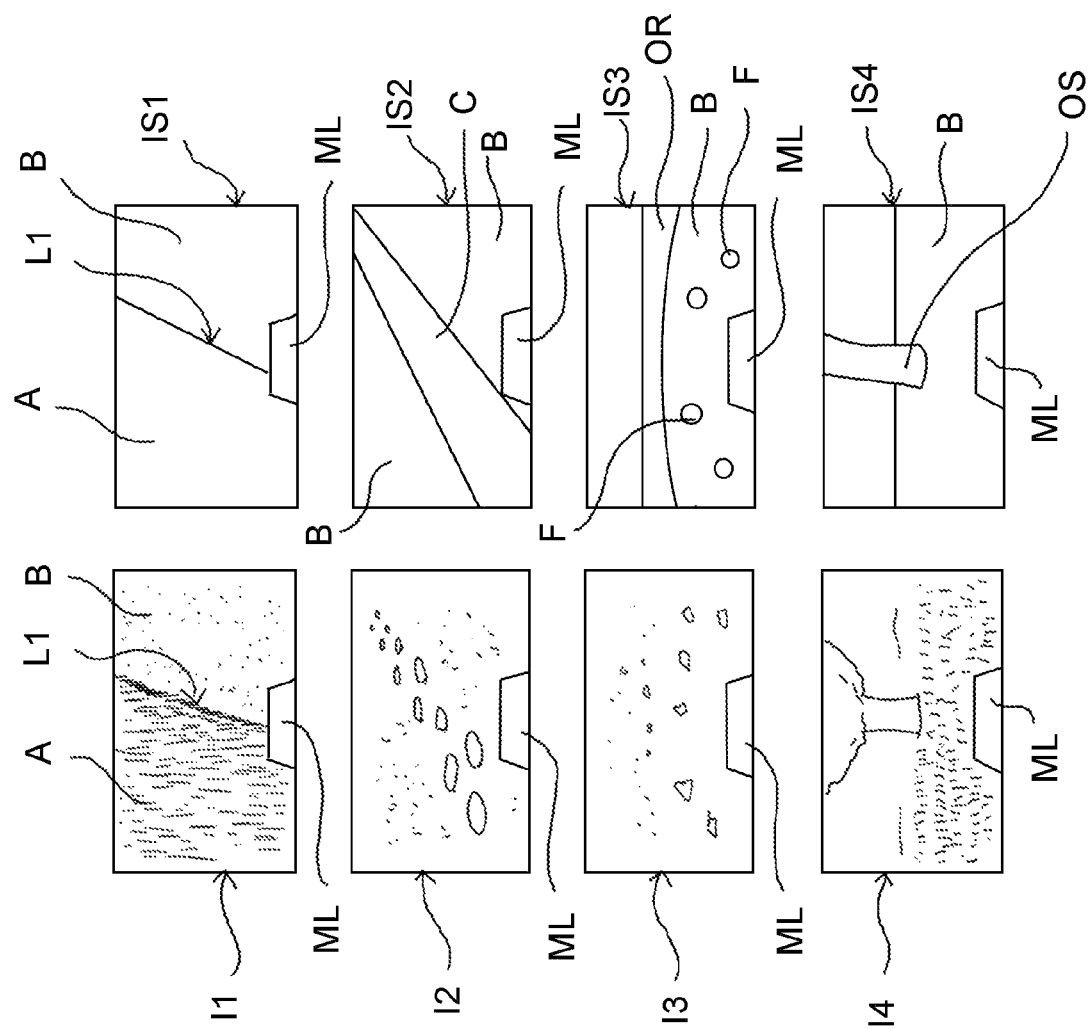
FIG. 4B shows examples of semantic segmentation of four digital images acquired.

FIG. 4B shows examples of semantic segmentation performed on four digital images I1, I2, I3, I4 acquired. In particular, the first image I1 shows a border or a discontinuity L1 between two soil areas having different properties, for example, area A=high grass, area B=short/cut grass. Reference ML indicates a portion of the soil working means filmed by the camera 203. A corresponding first semantically segmented image IS1 is provided by the method of the invention by means of the neural network 400 in response to the first image acquired I1.

Analogously, a second IS2, a third IS3 and a fourth IS4 semantically segmented image is provided by the method of the invention by means of the neural network 400 in response to the second I2, third I3 and fourth I4 image acquired, respectively.

In particular, the second semantically segmented image IS2 includes two areas B=short/cut grass separated by an area C without grass. The third semantically segmented image IS3 includes, in the proximity of the working means, an area B=short/cut grass in which leaf elements F are present. Such a third image IS3 also includes a horizon area OR separated from the area B. The fourth semantically segmented image IS4 includes an area B=short/cut grass in which an obstacle OS is present.

It should be noted that such a neural network 400 may be suitable for different types of grasses or cereals, as well as for different agricultural soils and thus used in the control method 100 and applied to the related system 1000. For example, applied to a harvesting machine in a field of ripe wheat, such a neural network 400 returns an image which indicates with two different color codes the portion of field where the wheat was harvested and the one where it still has to be harvested. Such information is made available during the subsequent steps of the control method 100 for processing of the analytical type.

With reference to FIG. 5A, in a third embodiment of the invention, the synthetic soil descriptor is a specific action to be taken by means of working means based on the characteristics of the soil framed.

In this case, the convolutional neural network 500 or third convolutional neural network 500 is substantially analogous to the convolutional network 300 and comprises at least the following layers:

- an input layer 501 configured to receive the entire digital image or at least one down-sample of the digital image acquired;
- at least one convolutional layer conv 1;
- at least one fully connected layer 503*a*;
- an output layer 504 with at least one neuron configured to make the distinction between at least two specific actions to be taken on the soil available.

In greater detail, the network 500 comprises a respective convolution block 502 consisting of three convolutional layers conv 1, conv 2, conv 3 in cascade and of three Max Pooling layers MP1, MP2, MP3. Each Max Pooling layer is directly connected to the output of a respective convolutional layer.

In the example of FIG. 5A, the neural network 500 consists of two fully connected layers 503*a* and 503*b*. Again with reference to the preferential and non-limiting example of grass cutting, each output neuron of the network 500, normalized accordingly to the others with a suitable softmax operation, represents a specific action of the lawn mower. Therefore, the class does not express the visible properties of the grass, but rather a practical action immediately attributable to the images acquired. This approach is defined "pixel-to-action" or "end-to-end". Such an approach, as it will be described below in detail, minimizes the complexity of the subsequent steps of the control method 100, already returning a primitive of the action command to be sent to the locomotion member 201 or to the working member 202.

FIG. 5B shows, in a table, an example of coding the action classes to be carried out based on a processing performed by the neural network 500 on the images acquired. In particular, such a table associates a unique numeric code to each action (e.g. keep going straight, stop the motion, etc.) to be carried out by the locomotion member 201 of the working means following the processing of the digital images acquired by means of the neural network 500.

It should be noted that the control method 100 of the invention further comprises a further step relating to the training 600, 700, 800 of each of the three examples of neural network 300, 400, 500 described above.

Figure 6:
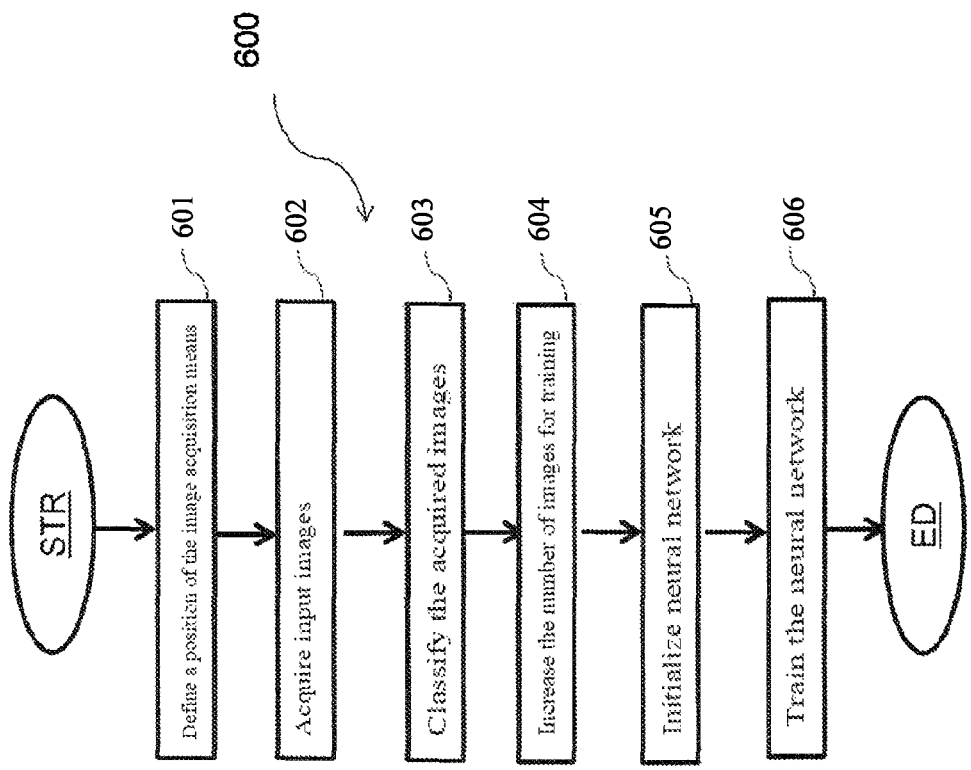
FIG. 6 shows a flowchart of a training method of the neural network of FIG. 3A.

In particular, with reference to FIG. 6, explanatory details of the training method 600 of the first neural network 300 are described.

In particular, such a method 600 comprises an initial step 601 of defining a position and an orientation of the digital image acquisition means 203 installed on the working means.

In the case of the lawn mower, according to an exemplifying and non-limiting aspect of the present invention, a camera 203 with a Bayer RGB filter, with a 69.5 dB dynamic range and a 180-degree lens was installed. It is positioned along the axis of symmetry of the lawn mower, at a height of 26 cm from the ground. Such a camera is facing forward with a tilt of about −30 degrees, so as to mainly film the soil in front of the lawn mower. The down-sample of the selected image of 109×109 pixels in size represents, due to the perspective, a portion of soil roughly shaped as an isosceles trapezoid with a long base equal to 76 cm, a height of 73 cm and a short base equal to 24 cm. The framed area measures about 0.36 square meter and therefore contains a portion of soil sufficient to identify the characteristics thereof.

The method 600 then includes acquiring 602 a plurality of input digital images of the soil to be worked in different working stages thereof.

In the exemplifying case of the lawn mower, the latter was kept moving for 34 days, for about 8 hours a day, on different types of grassy soils, with different obstacles and in different lighting and meteorological conditions (from dawn to dusk, during storms and in clear sky conditions). Specifically, 3 images per second were acquired, for a total of about 3 million images acquired over the entire period.

Furthermore, the classification 603 of the plurality of acquired digital images is provided. Such a classification is performed by associating a suitable label or code to each digital image acquired. In the specific case of the lawn mower, the plurality of images was classified manually using the classes of FIG. 3B.

At this point, the method 600 provides for the initialization 605 of the neural network 300 by associating thereto weights of the neural connections randomly or by default.

The following step 606 of training the network 300 occurs by means of a back-propagation method of the type known to a skilled in the art. In the case of the lawn mower, the SGD (Stochastic Gradient Descent) method was used. In particular, at least one level of the neural network 300 is then trained by modifying the weights associated to the network on the basis of the labels of the plurality of classified digital images.

Figure 7:
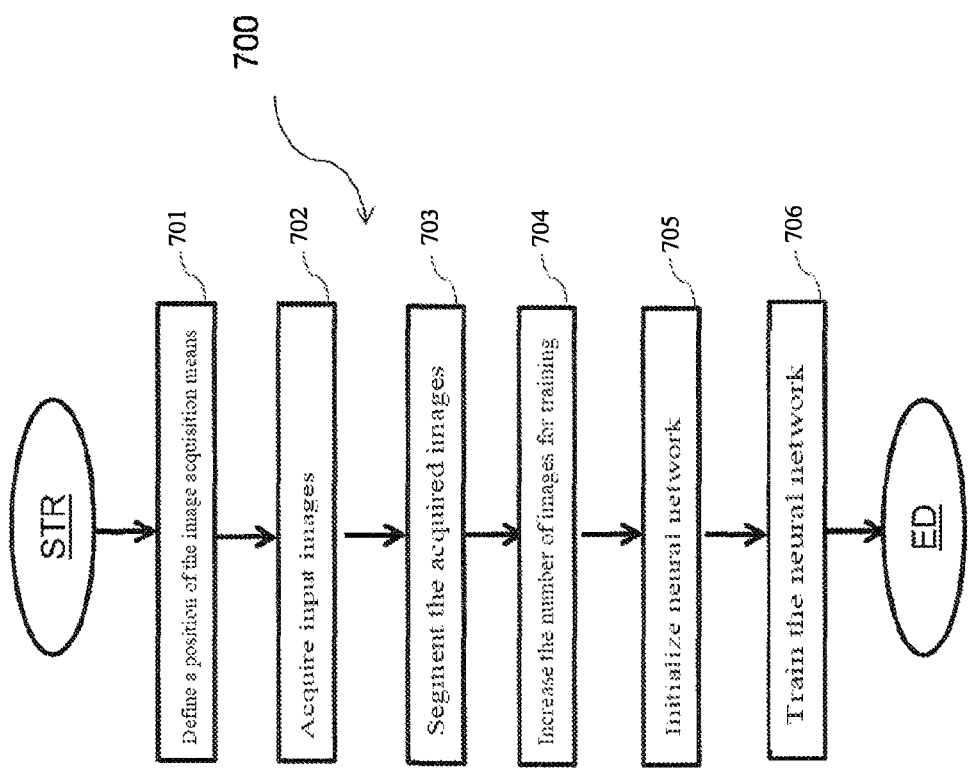
FIG. 7 shows a flowchart of a training method of the neural network of FIG. 4A.

With reference to FIG. 7, the training method 700 of the second neural network 400 is described in detail.

In particular, such a method 700 comprises an initial step 701 of defining a position and an orientation of the digital image acquisition means 203 installed on the working means.

The method 700 then includes a step 702 of acquiring a plurality of input digital images of the soil to be worked in different working stages thereof.

Furthermore, a step 703 of segmenting the plurality of acquired digital images by associating the same identifier (color) to each portion of image is included. In the case of the lawn mower, each image used for the training was colored with a uniform shade at the different semantic classes identified. Therefore, a table has been defined, configured to uniquely assign one class and one class only to each chosen color.

At this point, the method 700 provides for the initialization 705 of the neural network 400 performed by means of associating thereto weights of the neural connections randomly or by default.

The following step 706 of training the network 400 occurs by means of a back-propagation method known to a skilled in the art. In particular, the weights associated to the network based on the identifiers of the plurality of segmented digital images are then modified.

Figure 8:
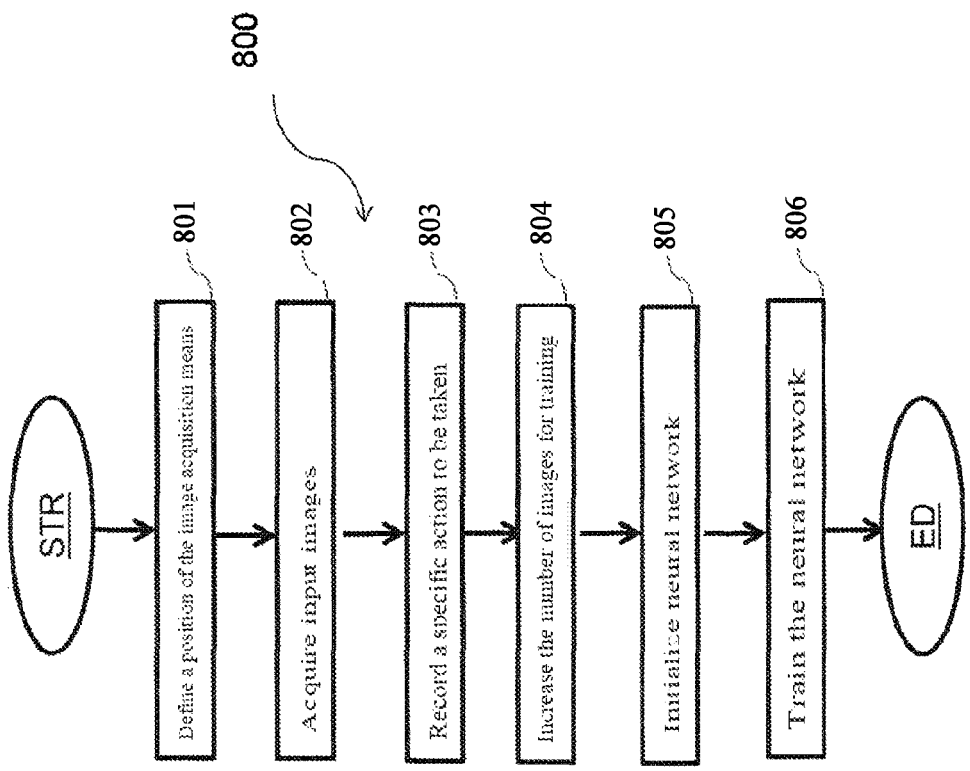
FIG. 8 shows a flowchart of a training method of the neural network of FIG. 5A.

With reference to FIG. 8, the training method 800 of the third neural network 500 is described in greater detail.

In particular, such a method 800 comprises an initial step 801 of defining a position and an orientation of the digital image acquisition means 203 installed on the working means. In this case, the working means are moved by an operator.

The method 800 then comprises a step 802 of acquiring a plurality of input digital images of the soil to be worked in different working stages thereof.

Furthermore, the method 800 includes a step 803 of recording a specific action to be taken by means of the working means based on the characteristics of the soil. In particular, each specific action is associated with an acquired image of the aforesaid plurality of images.

At this point, the method provides for the initialization 805 of the neural network 500 by means of associating thereto weights of the neural connections randomly or by default.

The following step 806 of training the network 500 occurs by means of a back-propagation method. In particular, the weights associated to the network are modified on the basis of the specific actions which have been associated to the plurality of acquired digital images.

In a preferred embodiment of the method of the invention, each step of training the three examples of neural network 300, 400, 500 further comprises a step 604, 704, 804 of increasing the number of images which can be employed for the training by performing further processing operations on the original images acquired. This is accomplished, for example, by performing rotations of each image, by selecting down-samples of the images or by correcting, for each image, at least one chromatic channel.

In the exemplifying and non-limiting case of the lawn mower, the plurality of 3 million starting images acquired has been increased to bring it up to 6 million images by performing only the horizontal overturning of each image. With further expedients, such as brightness and contrast corrections, it is possible to reach an overall number of images for the training equal to about 20 million images.

The advantage achieved by this step of increasing 604, 704, 804 is that of making available to the neural network 300, 400, 500 a greater number of images to be used for the training and, therefore, improving the learning by the network itself.

In a particular embodiment of the method of the invention, the aforesaid step 600, 700, 800 of training the network 300, 400, 500 further comprises a step of controlling the consistency of each image of said plurality of digital images with the other acquired images of the same class.

Thereby, making available to the neural network images mistakenly acquired by the camera 203, which may not be consistent with the detected soil scenario, is avoided. This increases the accuracy of the classification.

It should be noted that, downstream of the training step, the method 100 of the invention comprises further steps adapted to specify, for each of the three examples of neural network 300, 400, 500, the afore-mentioned step 104 of generating at least one control signal of the locomotion member 201 or of the working member 202 based on soil classification.

Figure 9B:
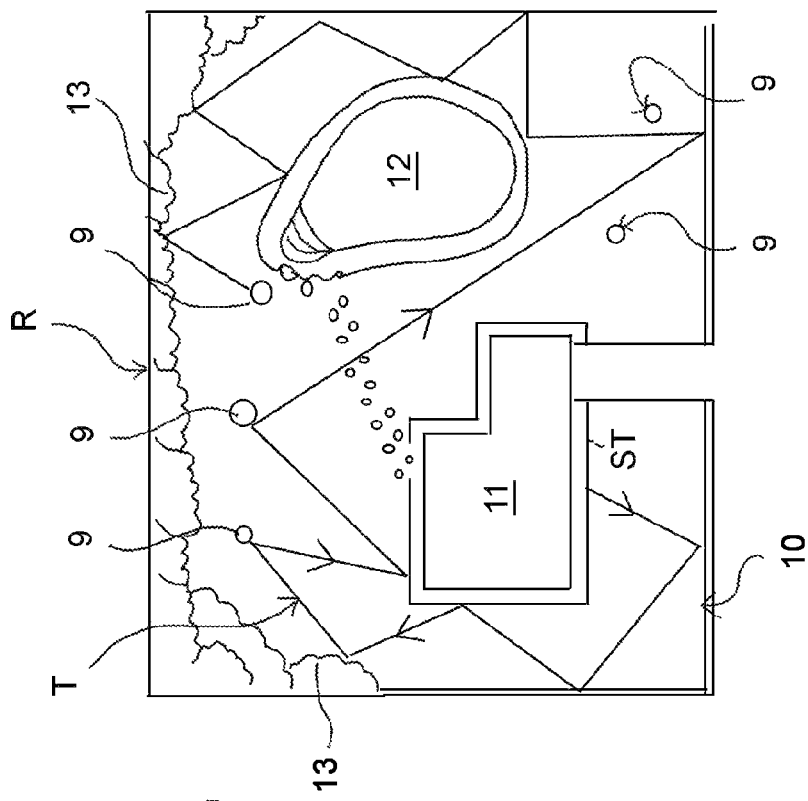
FIGS. 9A-9B show a flowchart of a method for controlling the movement of a soil working means based on image processing performed by the neural network of FIG. 3A, and a corresponding application scenario, respectively.
Figure 9A:
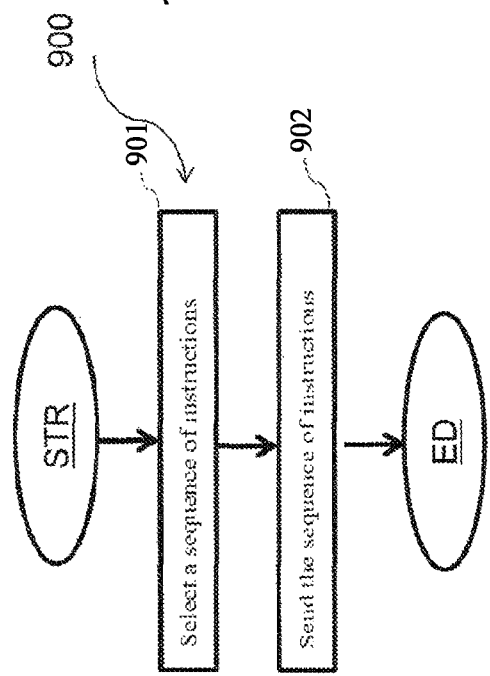

In particular, with reference to FIG. 9A, in the case of a synthetic soil descriptor which is a soil classification, the step 104 of generating at least one control signal, indicated by reference numeral 900, comprises:

- a step 901 of selecting a predetermined sequence of motion or working instructions, each associated to the soil classification obtained on the basis of the processing performed with a trained neural network 300;
- a step 902 of sending such a motion instruction sequence to the locomotion member 201 or working instruction sequence to the working member 202 of the working means.

In this first case, such motion instructions are selected from the group consisting of: keeping the direction; changing direction, stopping/starting the locomotion member 201 or the working member 202.

In the exemplifying and non-limiting case of the robotic lawn mower, each soil class of FIG. 3B produces the selection 901 of specific motion and working instructions. For example, class 000 "Overgrown grass" produces the selection of a motion action "Keep the direction". For example, class 009 "Grass with hose" produces the selection of a motion action "Keep the direction" and of a working action "Stop the cutting member": thereby, the lawn mower may cover the entire working area without remaining confined by the hose, but at the same time interrupting the cutting so as to avoid damaging it with the blades. For example, class 500 "Paving" produces the selection of a motion action "Change the direction": thereby the lawn mower remains confined on the turf.

Based on such motion instructions, in FIG. 9B an example of trajectory T followed by a soil working means is shown, for example a grass-cutting machine configured to implement the method 100 of the invention employing the first neural network 300, which is free to move in a residential area R starting from a travel starting point ST. For example, such a residential area R is delimited by a peripheral wall 10, by a residential structure 11, by an entertaining structure 12, by bushes/shrubs 13 and trees 9.

With reference to FIG. 9B, the Applicant has verified that the robotic lawn mower which is moved and controlled in accordance with the control method of the invention moves pseudo-randomly in the working area, remaining confined therein without requiring the aid of external infrastructure. Furthermore, the lawn mower reacts to obstacles in a more intelligent manner with respect to the solutions currently on the market. According to a preferential aspect of the present invention, some instruction sequences may be defined by the user. For example, with reference to FIG. 3B, class 003 "Grass with flagstones" may be defined by users at their will: it may be traversable "Keep the direction" or non-traversable "Change the direction". The modes in which the user may interact with the system 1000 are defined further below.

It should be noted that the role of the user does not consist in training the system to new classes of obstacles. The user simply associates each class of obstacles that the vehicle is already trained to recognize with the most convenient control action. In other words, the user does not perform a training of the soil working means, but only defines his own preferences.

Figure 10B:
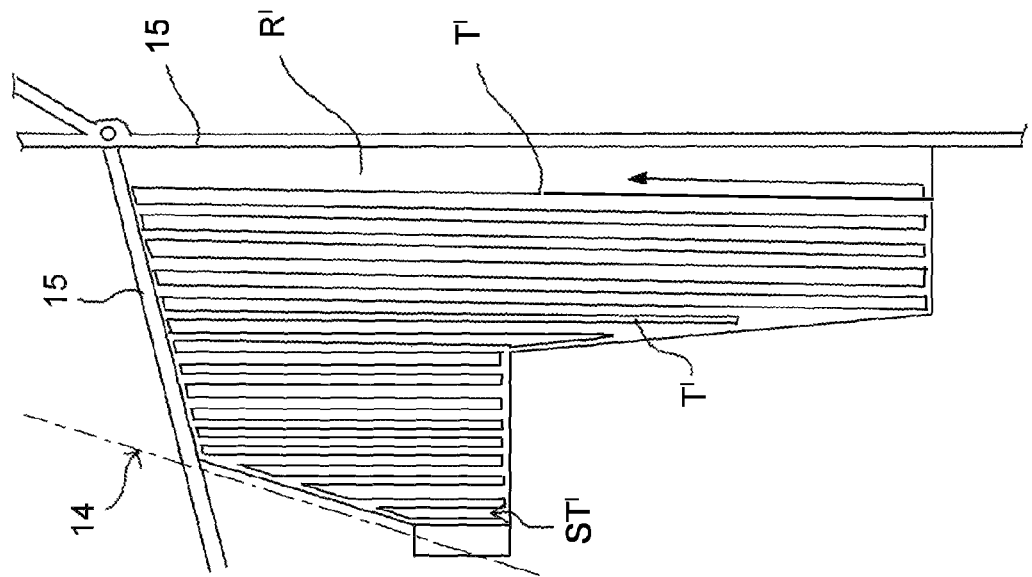
FIGS. 10A-10B show a flowchart of a method for controlling the movement of a soil working means based on image processing performed by the neural network of FIG. 4A, and a corresponding application scenario, respectively.
Figure 10A:
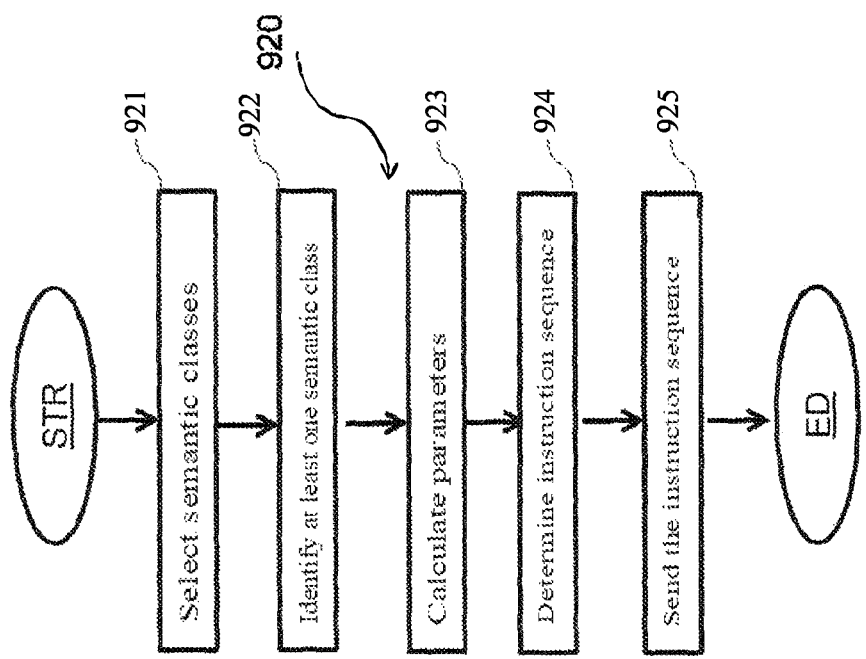

With reference to FIG. 10A, in the case of a synthetic soil descriptor which is a soil semantic segmentation, the step 104 of generating at least one control signal, indicated by reference numeral 920 as a whole, comprises the following steps:

- selecting 921 at least one couple of semantic classes at the border thereof it is desired for the working means to remain aligned;
- identifying 922 the at least one couple of semantic classes on the semantically segmented image;
- if the classes of the couple are adjacent, a step 923 of calculating the parameters which characterize a separation curve or border of such two classes by means of a regression method;
- determining 924 a motion or working instruction sequence based on such calculated parameters which characterize the separation curve between the two soil classes;

sending 925 such motion instruction sequence to the locomotion member 201 or working instruction sequence to the working member 202 of the working means.

In particular, in this second case, the aforesaid motion instructions are selected from the group consisting of:
rotation instructions, for correcting the orientation of the working means by keeping it parallel to a straight line tangent to the separation curve of the two classes;
translation instructions, for correcting the position of the working means by keeping it on the separation curve of the two classes;
instructions for reversing the travel direction of the means and keeping it confined to the working area;
instructions for circumventing an obstacle.

In general, if the machine is far from the border between two soil classes, the control method implemented by the system 1000 sends instructions which bring the machine itself on such a border (translation motion). Once the border is reached, the control method is configured to align the machine to such a border by performing an angle correction to keep the machine aligned to such a border.

In the exemplifying case of the robotic lawn mower, it is desirable that it proceeds along the previous cutting lines, thus cutting the lawn on parallel strips. By selecting the semantic classes "cut grass" and "uncut grass", images I1 and I1S of FIG. 4B, it appears that they are two adjacent classes in the semantically segmented image IS1 and are separated by a border line L1. The set of points at the border between the two classes may be approximated with a straight line, for example, by means of a linear regression. Such a straight line is characterized by an offset and by an angular coefficient. If the lawn mower is perfectly aligned with the border between cut grass and uncut grass, then such a straight line will be practically vertical (zero angular coefficient in the selected coordinate system of image IS1). If, on the contrary, the lawn mower is misaligned with respect to the aforesaid border L1, then such a straight line will appear oblique (positive or negative angular coefficient in the selected coordinate system of image IS1). The selected motion instructions rotate the lawn mower proportionally to such a coefficient, keeping it along the previous cutting lines and allowing it to proceed with order. In the specific example, if the coefficient is negative, the lawn mowing machine will rotate clockwise and vice versa. The offset of the straight line, according to the system of selected coordinates, characterizes the deviation of the robotic lawn mower from the aforesaid border. If the straight line mainly lies in the right half field of view, instructions are selected which make the machine translate to the right so as to align itself with the border. If the straight line mainly lies in the left half field of view, instructions are selected which make the machine translate to the left so as to align itself with the border.

Based on such motion instructions, the Applicant has verified that the soil working means, for example a harvesting machine moved in accordance with the control method 100 of the invention employing the neural network 400, follows a trajectory T' shown in FIG. 10B. It should be noted that such a harvesting machine is free to move on a working surface R' starting from a travel starting point ST'. For example, such a working surface R' is delimited by a pipeline of services and by various structures 15. The harvester, at each run, keeps itself aligned with and parallel to the cutting line followed during the previous trip, proceeding with order in the working of the field. Each time the end of the field is detected, it reverses the travel direction (rotation of 180 degrees) and realigns itself with the border between cut wheat and uncut wheat.

Figure 11B:
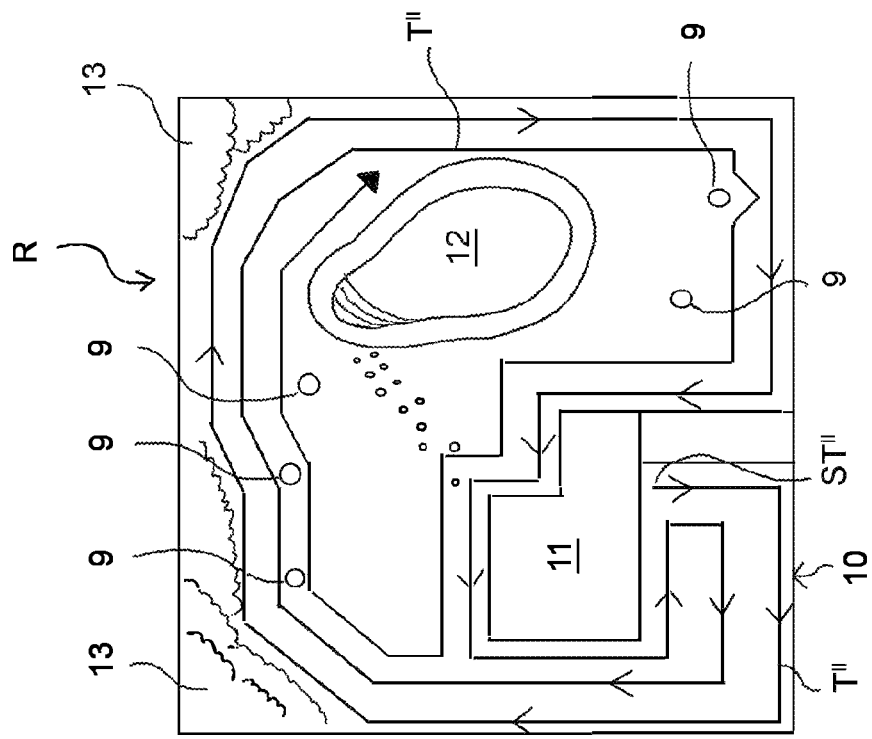
FIGS. 11A-11B show a flowchart of a method for controlling the movement of a soil working means based on image processing performed by the neural network of FIG. 5A, and a corresponding application scenario, respectively.
Figure 11A:
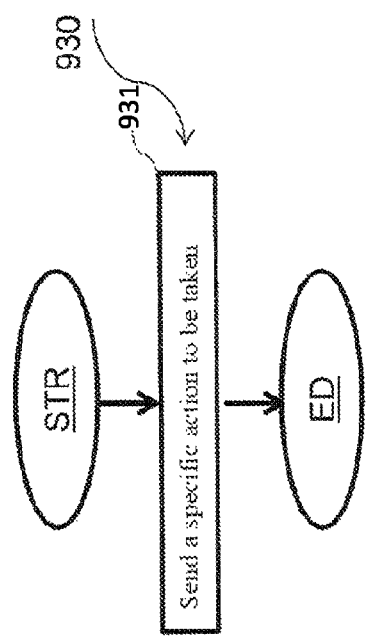

With reference to FIG. 11A, in the case of a synthetic soil descriptor, which is a specific action to be taken by means of the working means on the basis of the characteristics of the framed soil, the aforesaid step 104 of generating at least one control signal, indicated by reference numeral 930 as a whole, comprises a step 931 of sending a specific action to be taken to the locomotion member 201 or to the working member 202 of the working means, obtained on the basis of the processing performed with a trained neural network 500 (network of the Pixels to Action type).

In a first embodiment, such specific actions are classes of discontinuous actions selected from the group consisting of: increasing the speed, reducing the speed, randomly changing direction, stopping the motion, starting the motion, starting the working member, stopping the working member. In other words, an action is associated with a determined grass class which characterizes the soil.

In a second embodiment, such specific actions are regressions with respect to the input image and therefore the starting of each output neuron shows the value of a continuous action. For example, continuous actions are: rotating the travel direction by a value of X degrees; setting the travel power at a value Y; bringing the rotation speed of the working member 202 at the value of Z revolutions per second.

In an embodiment, the aforesaid actions are selected from the group consisting of:
rotation actions directed to the locomotion member (201) to correct the travel direction,
acceleration or deceleration actions directed to the locomotion member 201;
starting/stopping the working member 202.

Based on such motion instructions, a soil working means, for example a grass-cutting machine, configured to implement the method 100 of the invention employing the neural network 500, which is free to move in the afore-mentioned residential area R starting from a travel starting point ST", follows the example of trajectory T" shown in FIG. 11B. Such a residential area R is analogous to that described with reference to FIG. 9B. As exemplified in FIG. 9B, the lawn mower first proceeds following the peripheral border line 10 of the residential area R. The lawn mower then aligns itself with the previous cutting line, thus proceeding with concentric trajectories.

In a further embodiment, the method 100 of the invention further comprises a step of approving, by an operator or by means of a procedure defined by the operator, the aforementioned at least one control signal of the locomotion member 201 or of the working member 202 generated based on said synthetic soil descriptor. In other words, an operator, on-board the working means or remotely, may supervise the type of controlling actions sent to the means so as to approve (or decline) the sending thereof to the motion 201 and working 202 members.

It should be noted that the method for generating the synthetic soil descriptor and the consequent control signal is fully implemented on board the working means and no communication with the outside is required. In this case the communication is solely aimed at allowing the user to approve or not approve the execution of a determined action on board the vehicle.

As indicated above, the control method 100 of a soil working means of the present invention and the related system 1000 have several advantages and achieve the predetermined objects.

In particular, in order to allow the correct control and confinement of the lawn mower or of the more general soil working machine in a precise working area, the control method 100 of the invention, implemented by means of a software or a hardware in the processing unit 204 of the system, does not require the employment of infrastructure outside the machines themselves, as occurs in known solutions. Therefore, the suggested solution ensures a high portability of the system 1000.

Furthermore, the method 100 of the invention allows the lawn mower to display the operating scenario and to move accordingly, remaining therefore confined to the working area, avoiding obstacles and proceeding with order in performing the work.

The method 100 of the invention ensures the recognition, by the lawn mower, starting from at least one digital image acquired, of the presence of grass, of the characteristics of the different soil types, such as the grass height or the presence of items which are not grass.

The method of the invention is based on a "deep learning" approach which differs greatly from traditional statistical modeling.

In fact, in traditional statistical modeling, each property of the image is first analyzed by a human being who selects an appropriate model and explicitly encodes a logical flow of operations to process the image.

For example, according to an approach, multivariate statistical analysis is used, comparing the statistics of the image (or of a portion thereof) with the statistics of known surfaces, appropriately selected a priori and stored in memory. In this way a mapping (binary or fuzzy) of the image is generated.

Alternatively, one can resort to the use of small neural networks to recognize low-level features (textures and colors) of an image.

However, real images of soils have such a large and interconnected number of features that it is impossible to model all cases manually with traditional statistical modeling. Moreover, local characteristics are often not indicative in themselves without an overall interpretation: for example, a given texture can assume completely different semantic meanings depending on the context in which it is inserted.

The use of the method and the system of the invention allow to overcome the limits of the traditional statistical modeling as they allow to understand the salient properties and characteristics of the soil, abstracting from the innumerable cases mentioned above.

Furthermore, the trained neural networks 300, 400, 500 described and the related preferential training methods 600, 700, 800 thereof, specific for the recognition of the characteristics of the different soil types from the point of view of the working machine, in different cutting contexts, allow to implement control methods which are efficient and compact, and thus cheaper to manufacture.

Those skilled in the art, in order to meet contingent needs, may modify and adapt the embodiments of the method and system of the invention, and replace elements with others which are functionally equivalent, without departing from the scope of the following claims. Each of the features described as belonging to a possible embodiment may be accomplished irrespective of the other embodiments described.

The invention claimed is:

1. A method for controlling a soil working means, based on an image processing, said soil working means comprising a locomotion member and a working member, wherein the method comprises the steps of:

acquiring at least one digital image of the soil by means of digital image acquisition means installed on said working means;

processing, by means of an electronic processing unit, the at least one digital image acquired by performing at least one convolution operation on the digital image by means of a trained neural network, wherein said neural network comprises at least one convolutional layer and said at least one convolution operation is accomplished by means of a feed-forward of the neural network;

obtaining, by means of the electronic processing unit, at least one synthetic soil descriptor based on said processing;

generating, by means of the electronic processing unit, at least one control signal of said locomotion member or of said working member based on said synthetic soil descriptor.

2. The method for controlling a soil working means according to claim 1, wherein the generating step comprises the steps of generating at least one control signal of said locomotion member and at least one control signal of the working member.

3. The method for controlling a soil working means according to claim 1, comprising a further step of training the neural network at least with images of the soil workable or worked with said working member.

4. The method for controlling a soil working means according to claim 1, further comprising a step of generating, based on the aforesaid synthetic soil descriptor, data and/or parameters describing the nature or structure of the soil.

5. The method for controlling a soil working means according to claim 4, wherein said describing parameters comprise a border or a discontinuity between two soil areas having different properties.

6. The method for controlling a soil working means according to claim 5, wherein said border or discontinuity comprises a border between soil areas with plant species of different height or a border between previously cut or worked areas and areas not yet cut or worked.

7. The method for controlling a soil working means according to claim 1, wherein said synthetic soil descriptor is a soil classification and said convolutional neural network comprises at least the following layers:
   an input layer configured to receive the entire digital image or at least one down-sample of said digital image;
   at least one convolutional layer;
   at least one fully connected layer;
   an output layer with at least one neuron configured to make the distinction between at least two soil classes available.

8. The method for controlling a soil working means according to claim 1, wherein said synthetic soil descriptor is a soil semantic segmentation and said convolutional neural network comprises at least the following layers:
   an input layer configured to receive the entire digital image or at least one down-sample of the digital image;
   at least one convolutional layer;
   at least one deconvolutional layer;
   an output layer configured to make a soil image semantically segmented in at least two classes available.

9. The method for controlling a soil working means according to claim 1, wherein said synthetic soil descriptor is a specific action to be taken by means of the working means based on the characteristics of the soil framed, and said convolutional neural network comprises at least the following layers:
- an input layer configured to receive the entire digital image or at least one down-sample of the digital image;
- at least one convolutional layer;
- at least one fully connected layer;
- an output layer with at least one neuron configured to make the distinction between at least two specific actions to be taken on the soil available.

10. The method for controlling a soil working means according to claim 3, wherein said step of training the neural network comprises the steps of:
- defining a position and an orientation of said digital image acquisition means installed on said working means,
- acquiring in input a plurality of digital images of the soil to be worked in different working stages thereof,
- classifying said plurality of digital images by associating a label to each digital image acquired;
- initializing the neural network by associating weights to the connections randomly or by default;
- training the network by means of a back-propagation method to train at least one layer of the neural network by modifying the weights associated to the network on the basis of the labels of the plurality of classified digital images.

11. The method for controlling a soil working means according to claim 3, wherein said step of training the neural network comprises the steps of:
- defining a position and an orientation of said digital image acquisition means installed on said working means;
- acquiring in input a plurality of digital images of the soil to be worked in different working stages thereof;
- segmenting said plurality of digital images by associating a same identifier to each portion of image;
- initializing the neural network by associating weights to the connections randomly or by default;
- training the network by means of a back-propagation method to train at least one layer of the neural network by modifying the weights associated to the network on the basis of the semantic classes of the plurality of segmented digital images.

12. The method for controlling a soil working means according to claim 3, wherein said step of training the neural network comprises the steps of:
- defining a position and an orientation of said digital image acquisition means installed on said working means, said working means being movable by an operator;
- acquiring in input a plurality of digital images of the soil to be worked in different working stages thereof;
- recording a specific action to be taken by means of the working means based on the characteristics of the soil, each specific action being associated with an acquired image of said plurality;
- initializing the neural network by associating weights to the connections randomly or by default;
- training the network by means of a back-propagation method to train at least one layer of the neural network by modifying the weights associated to the network on the basis of the specific actions associated to the plurality of acquired digital images.

13. The method for controlling a soil working means according to claim 12, wherein said training step further comprises a step of increasing the number of images employable for the training by means of processing each of the selected original images, said processing operations being selected from the group consisting of:
image rotation,
image down-sample selection,
correction of at least one chromatic channel of the image.

14. The method for controlling a soil working means according to claim 13, wherein said training step further comprises a step of controlling the consistency of each image of said plurality of digital images with the other acquired images of the same class.

15. The method for controlling a soil working means according to claim 1, wherein said synthetic soil descriptor is a soil classification and said step of generating at least one control signal of said locomotion member or of said working member based on said soil classification, comprises the steps of:
- selecting a predetermined sequence of motion instructions associated to the soil classification obtained on the basis of the processing performed with a trained neural network;
- sending said motion instructions sequence to the locomotion member or to the working member of the working means.

16. The method for controlling a soil working means according to claim 15, wherein said motion instructions are selected from the group consisting of:
keeping the direction,
changing direction,
stopping/starting the locomotion member or the working member.

17. The method for controlling a soil working means according to claim 1, wherein said synthetic soil descriptor is a soil semantic segmentation and said step of generating at least one control signal of said locomotion member or of said working member based on said segmentation, comprises the steps of:
- selecting at least one couple of semantic classes at the border thereof it is desirable for the working means to remain aligned;
- identifying said at least one couple of semantic classes on the acquired image;
- if the classes of the couple are adjacent, calculating the parameters that characterize a separation curve or border of said two classes by means of a regression method;
- determining a motion or work instructions sequence based on said calculated parameters which characterize the separation curve;
- sending said motion instructions sequence to the locomotion member or said working instructions sequence to the working member of the working means.

18. The method for controlling a soil working means according to claim 17, wherein said motion instructions are selected from the group consisting of:
rotation instructions for correcting the orientation of the working means by keeping it parallel to the line tangent to the separation curve of the two classes;
translation instructions for correcting the position of the working means by keeping it on the separation curve of the two classes;
instructions for reversing the direction of the means and keeping it confined to the working area;
instructions for circumventing an obstacle.

19. The method for controlling a soil working means according to claim 1, wherein the synthetic soil descriptor is a specific action to be taken by means of the working means based on the characteristics of the imaged soil and said step of generating at least one control signal comprises a step of sending a specific action to be taken to the locomotion member or to the working member of the working means, obtained on the basis of the processing performed with the trained neural network.

20. The method for controlling a soil working means according to claim 19, wherein said specific action is a class of discontinuous actions selected from the group consisting of:
  increasing the speed,
  reducing the speed,
  changing the motion direction,
  stopping the motion,
  starting the motion,
  starting the working member,
  stopping the working member.

21. The method for controlling a soil working means according to claim 19, wherein said specific action is a continuous action.

22. The method for controlling a soil working means according to claim 19, wherein said specific action is selected from the group consisting of:
  rotation actions directed to the locomotion member to correct the travel angle,
  acceleration or deceleration actions directed to the locomotion member,
  starting/stopping said working member.

23. The method for controlling a soil working means according to claim 1, further comprising a step of approving, by an operator or by means of a procedure defined by the operator, said at least one control signal of the locomotion member or of the working member generated on the basis of said synthetic soil descriptor.

24. A system comprising:
  a soil working means comprising a locomotion member and a working member,
  digital image acquisition means installed on said working means for acquiring at least one digital image of the soil;
  an electronic processing unit connected to said digital image acquisition means and to said locomotion member and working member of the soil working means, said electronic processing unit being configured to perform the steps of the method according to claim 1.

25. The system according to claim 24, wherein said electronic processing unit comprises at least one processor and a memory block associated to the processor for storing instructions, said processor and said memory block being configured to perform the steps of the method according to claim 1.

26. The system according to claim 24, wherein said soil working means is selected from the group consisting of:
  lawn mower,
  harvester,
  plow,
  cereal cutting-harvesting machine,
  vegetable cutting-harvesting machine,
  hay cutting-harvesting machine.

27. The system according to claim 24, wherein said processing unit comprises an input/output interface connected to the at least one processor and to the memory block to allow an operator near the system to interact directly with the processing unit.

28. The system according to claim 24, further comprising a wired or wireless communication interface for connecting said processing unit to a data communication network, to allow an operator to remotely interact with the processing unit.

29. The method for controlling a soil working means according to claim 15, wherein when the soil classification is 500 "paving" the selected sequence of motion instructions is "change the direction".

30. The method for controlling a soil working means according to claim 5, wherein said border or discontinuity comprises a border between soil areas with grass and soil areas without grass.

* * * * *